United States Patent [19]

Sodeno et al.

[11] Patent Number: 5,048,372
[45] Date of Patent: Sep. 17, 1991

[54] TRANSMISSION GEAR POSITION DEPENDENT OUTPUT CONTROL SYSTEM FOR AUTOMOTIVE INTERNAL COMBUSTION ENGINE

[75] Inventors: Tsuyoshi Sodeno; Shozo Nakayama; Kiyomi Kawamizu, all of Kanagawa; Yuji Kato, Tokyo; Nobutaka Takahashi, Kanagawa, all of Japan

[73] Assignee: Nissan Motor Company, Limited, Japan

[21] Appl. No.: 447,128

[22] Filed: Dec. 11, 1989

[30] Foreign Application Priority Data

Dec. 12, 1988 [JP] Japan ................. 63-311883

[51] Int. Cl.⁵ ............................................. B60K 41/05
[52] U.S. Cl. ........................................ 74/860; 74/872
[58] Field of Search ............... 74/857, 859, 860, 878, 74/872

[56] References Cited

U.S. PATENT DOCUMENTS

| | | | |
|---|---|---|---|
| 3,799,008 | 3/1974 | Danek | 74/860 |
| 3,805,642 | 4/1974 | Danek et al. | 74/860 |
| 3,948,116 | 4/1976 | van Pelt | 74/860 X |
| 4,073,202 | 2/1978 | Aoyama et al. | 74/860 |
| 4,290,323 | 9/1981 | Gospodar | 74/872 X |
| 4,463,629 | 8/1984 | Himmelstein | 74/860 X |
| 4,596,164 | 6/1986 | Hasegawa et al. | 74/860 |
| 4,693,225 | 9/1987 | Abe et al. | 74/860 X |
| 4,805,103 | 2/1989 | Matsuda | 364/426.02 |
| 4,823,642 | 4/1989 | Iwaki et al. | 74/860 |
| 4,823,645 | 4/1989 | Gaus et al. | 74/872 X |
| 4,869,132 | 9/1989 | Clem | 74/860 X |

Primary Examiner—Dwight Diehl
Attorney, Agent, or Firm—Lowe, Price, LeBlanc & Becker

[57] ABSTRACT

An engine output characteristics control system includes means for monitoring a selection of speed ratios of a power transmission to provide information concerning transmission gear position. The control system receives transmission gear position indicative information to detect selection of a specific speed ratio of the transmission for providing information indicative of the selection of the specific transmission gear position. The control system is responsive to the specific transmission gear position selection indicative information for deriving an engine control signal for controlling the engine output characteristics so that the engine output is adapted to the specific speed ratio.

13 Claims, 6 Drawing Sheets

TRANSMISSION GEAR POSITION DEPENDENT OUTPUT CONTROL SYSTEM FOR AUTOMOTIVE INTERNAL COMBUSTION ENGINE

BACKGROUND OF THE INVENTION

1. Field of the Invention

The present invention relates generally to an output control system for an internal combustion engine for an automotive vehicle. More specifically, the invention relates to an engine output control system for adjusting an engine output depending upon a selected speed ratio of a power transmission.

2. Description of the Background Art

In automotive vehicles, power transmissions are provided for selecting appropriate speed ratios depending upon vehicle driving conditions. The power transmission thus variable of its output depending upon the engine output and the selected speed ratio. At various speed ratio of the power transmission, it is desirable to provide different engine output characteristics so as to adapt to the selected speed ratio.

For example, Japanese Patent First (unexamined) Publication (Tokkai) Showa 57-93681 discloses a control system for an internal combustion engine, which control system controls output characteristics of the engine. In the disclosed system, spark advance angle is adjusted depending upon the speed ratio of the power transmission. For instance, the control system is responsive to shifting up on the speed ratio for temporarily retarding spark advance angle for lowering engine output torque for smooth transition during transmission gear shifting up. Temporary retarding of spark advance angle may assist for prevention of engine knocking and thus prevents the spark advance angle from being excessively retarded.

On the other hand, in the modern automotive technologies, engine output performance is significantly improved to provide higher engine power. Higher performance of the engine may cause difficulty in adjusting the driving power provided by the engine at certain driving conditions. Particularly, when it is required to drive the vehicle at very low speed, such as a speed lower than human walking speed, difficulty is encountered in adjusting the vehicle speed by adjusting the engine driving power. For example, in backward driving, in the transmission reverse gear position, a low vehicle driving speed is preferred. Due to high engine performance, delicate accelerator control becomes necessary for adjusting the vehicular speed at substantially low speed.

SUMMARY OF THE INVENTION

In view of the needs set forth above, it is an object of the present invention to provide a capability of output control for adjusting output characteristics of an automotive internal combustion engine.

Another object of the invention to provide an engine output characteristics control system, which adapt the engine output to a speed ratio of a power transmission.

In order to accomplish the aforementioned and other related objects, an engine output characteristics control system, according to the present invention, includes means for monitoring a selection of speed ratio of a power transmission to provide an information concerning transmission gear position. The control system receives the transmission gear position indicative information to detect selection of a specific speed ratio of the transmission for providing an information indicative of the selection of the specific transmission gear position. The control system is responsive to the specific transmission gear position selection indicative information for deriving an engine control signal for controlling the engine output characteristics so that the engine output is adapted to the specific speed ratio.

According to one aspect of the invention, an output characteristics control system for an internal combustion engine comprises:

means, associated with the engine, for adjusting engine output characteristics according to a control signal;

means, associated with a power transmission, for detecting a predetermined specific transmission gear position for producing a specific gear position indicative signal;

means for selecting engine output characteristics based on the gear position of the power transmission, the engine output characteristics selecting means selecting a first normal output characteristics in absence of the specific gear position indicative signal and selecting a second limited output characteristics in presence of the specific gear position indicative signal for producing the control signal represented selected one of the first and second output characteristics.

The specific gear position may be the "reverse" position. In the preferred construction, the engine output characteristics adjusting means may comprise a spark advance adjusting means for setting spark advance at normal advance angle to be derived normal spark advance control parameters in the first normal output characteristics and for retarding spark advance for a predetermined magnitude in the second limited output characteristics. In such case, the engine output characteristics adjusting means may progressively retard spark advance according to an elapsed time in which the specific gear position is maintained. The output characteristics control system may further comprise means for monitoring an engine revolution speed for providing engine speed data and means for monitoring an engine load for providing engine load data, and the engine output characteristics selecting means selects the second limited output characteristics when the specific gear position of the power transmission is selected while an engine operation range as defined by the engine speed data and the engine load data is within a predetermined range.

In the alternative, the engine output characteristics adjusting means comprises a fuel injection system which supplies fuel for all engine cylinders in the first normal output characteristics and supplies fuel for a limited number of engine cylinders in the second limited output characteristics. In such a case, the engine output characteristics adjusting means decreases the number of engine cylinder to which fuel is supplied according to expansion of period to maintain the specific transmission gear position.

In a further alternative, the engine output characteristics adjusting means may comprise an auxiliary throttle valve disposed within an air induction system of the engine and selects the fully open position of the auxiliary throttle, valve in the first normal output characteristics and limit the opening angle of the auxiliary throttle valve to a predetermined partially open position in the second limited output characteristics. In such a case, the engine output characteristics selecting means derives the magnitude of the partially open angle of the auxiliary throttle valve in relation to a magnitude of the open angle of a primary throttle valve disposed in the air induction system and associated with an accelerator to adjust the angular position according to operational position of the accelerator, the vehicle speed or the engine speed.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment, but are for explanation and understanding only.

In the drawings.

DESCRIPTION OF THE PREFERRED EMBODIMENT

Figure 1:
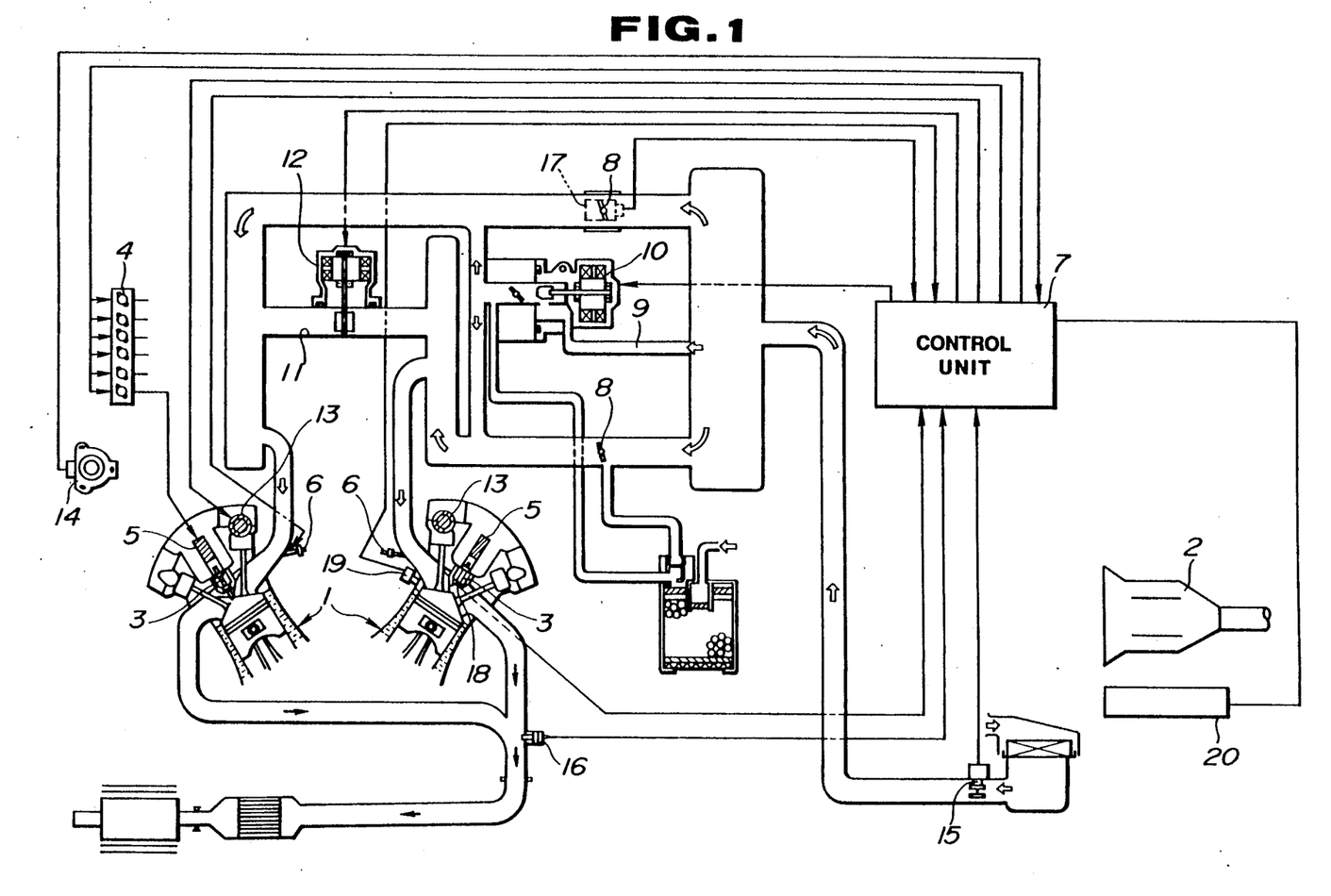
FIG. 1 is a schematic block diagram of the preferred embodiment of an automotive engine associated with the preferred embodiment of a control system according to the present invention.

Referring now to the drawings, particularly to FIG. 1, an internal combustion engine 1 is associated with a power train which includes an automatic power transmission 2 for delivering engine output to driving wheels (not shown). As will be appreciated from FIG. 1, the shown internal combustion engine 1 has V-type engine cylinder layout and is associated with a variable air induction system. While the specific embodiment in terms of the shown type internal combustion engine, the principle of the present invention is applicable not only for the shown engine but also for other types of automotive internal combustion engine.

The engine 1 has a plurality of engine cylinders. A spark ignition plug 3 is inserted into each engine cylinder. The spark ignition plug 3 shown in FIG. 1, has an integrally associated ignition coil 5 for formulating direct power distirbution which does not require power distribution cable. The ignition coil 5 is electrically connected to a power transistor unit 4 which has a plurality of power transistors respectively associated one of the ignition coils 5 for triggering the latter at a predetermined schedule in synchronism with an engine revolution cycle. For each of engine cylinders, there is also provided a fuel injection valve 6 in the vicinity of an induction port. The power transistor unit 4 and fuel injection valves 6 are respectively connected to a control unit 7 which comprises a microprocessor.

The engine 1 is associated with an air variable induction system. The shown air induction system has branched passages separated downstream of a collector section. Primary throttle valves 8 are disposed in the branched passages. The induction system further includes a by-pass passage 9 for adjusting auxiliary air flow rate. An auxiliary air flow control valve 10 is associated with the by-pass passage 9 in order to adjust flow rate of an auxiliary air so as to control an engine idling speed. The auxiliary air flow control valve 10 is also connected to the control unit 7 to receive an auxiliary air control signal having a variable duty cycle in order to adjust valve opening duty ratio and whereby to adjust the flow rate of the auxiliary air flow rate.

Each of the branched passages is connected to one side bank of the V-type engine. The branched passages communicate with each other via a communication passage 11. A variable induction control valve 12 is disposed within the communication passage 11 in order to establish and block induction air communication through the communication passage. The variable induction control valve 12 is also connected to the control unit 7 so as to be controlled the valve position according to a variable induction air control signal. Depending upon establishing and blocking of communication passage 11, the output of the engine can be adjusted.

Furthermore, the air induction system includes a valve timing control mechanism 13 is provided for adjusting valve timing of an intake valve disposed within the induction port. The valve timing control mechanism 13 is connected to the control unit 11 so that it may be operated according to a valve timing control signal produced by the control unit for adjusting open timing of the intake valve.

In order to perform a control operation, the control unit 7 receives various engine driving condition indicative data from various sources. For this purpose, the shown embodiment of the control unit 7 is connected to a crank angle sensor 14, an air flow meter 15, an oxygen sensor 16, a throttle angle sensor 17, a knock sensor 18 and an engine coolant temperature sensor 19. The sensors listed hereinabove are per se known construction and available from the market.

The crank angle sensor 14 is associated with a crankshaft in the shown embodiment. However, in case the engine is associated with a mechanical power distributor, the crank angle sensor may be incorporated in the power distributor. The crank angle sensor 14 produces a crank reference signal at every predetermined angular positions, i.e. predetermined angle before top-dead-center (BTDC) of each engine cylinder, and a crank position signal at every given angle of angular displacement of the crankshaft, e.g. 1°. Either of the crank reference signal or the crank position signal may be used for deriving data representative of an engine revolution speed, which data will be hereafter referred to as an "engine speed data".

The air flow meter 15 is disposed within the air induction system at an orientation upstream of the collector section. The air flow meter 15 is designed for monitoring the flow rate of induction air to produce an air flow rate indicative signal which is representative of an engine load. Though the illustrated embodiment utilizes the air flow meter 15 for monitoring the engine load to producing the air flow rate indicative signal as the engine load indicative data, it is possible to use different ways for monitoring the engine load. For instance, as proposed in U. S. patent application Ser. No. 195,975, filed on May 19, 1988, now U.S. Pat. No. 4,892,0 the engine load can be arithmetically derived on the basis of a throttle valve open angle. Furthermore, the intake vacuum data as monitored by a vacuum sensor can be used in place of data from the air flow meter.

The oxygen sensor 16 is disposed within an exhaust passage for monitoring an oxygen concentration in an exhaust gas exhausted from the engine. The oxygen sensor 16 is designed for producing an oxygen sensor signal varying the signal value when an air/fuel mixture ratio varies across a stoichiometric value.

The throttle angle sensor 17 is associated with the primary throttle valve 8 for monitoring the open angle of the throttle valve so as to produce a throttle angle position indicative signal.

The knock sensor 18 comprises a vibration sensor monitoring vibration of an engine cylinder block and produces a knocking magnitude indicative signal representative of vibration of the engine cylinder block. As can be seen, the shown embodiment employs a washer type vibration sensor as the knock sensor, which washer type sensor is secured onto the engine cylinder block together with the spark ignition plug 3. However, the knock sensor is not specified to the shown type but can be placed with any suitable sensor which can monitor the engine knocking. The engine coolant temperature sensor 19 is disposed within a water jacket in the engine cylinder for monitoring the temperature condition of the engine coolant flowing therethrough. The engine coolant temperature sensor 19 thus produces an engine coolant temperature indicative signal.

In addition to the sensors set forth above, the control unit 7 is further connected with a transmission shift position sensor 20 which is associated with the automatic power transmission for detecting the selected transmission gear position or speed ratio to produce a transmission shift position indicative signal.

Based on the control parameters set forth above, the control unit 7 performs various control, such as spark ignition control, fuel injection control, an auxiliary air flow rate control, the induction air flow rate control and so forth in order to adapt the engine operation to the driving condition for optimizing the performance of the engine. In the shown embodiment, the transmission gear position dependent engine output control is performed by adjusting the spark advance angle. Particularly, the shown embodiment of the engine output control system is designed for adjusting spark advance angle when the automatic power transmission is selected or shifted into the reverse gear position. The process of the transmission gear position dependent engine output control will be discussed herebelow with reference to FIG. 2.

Figure 2:
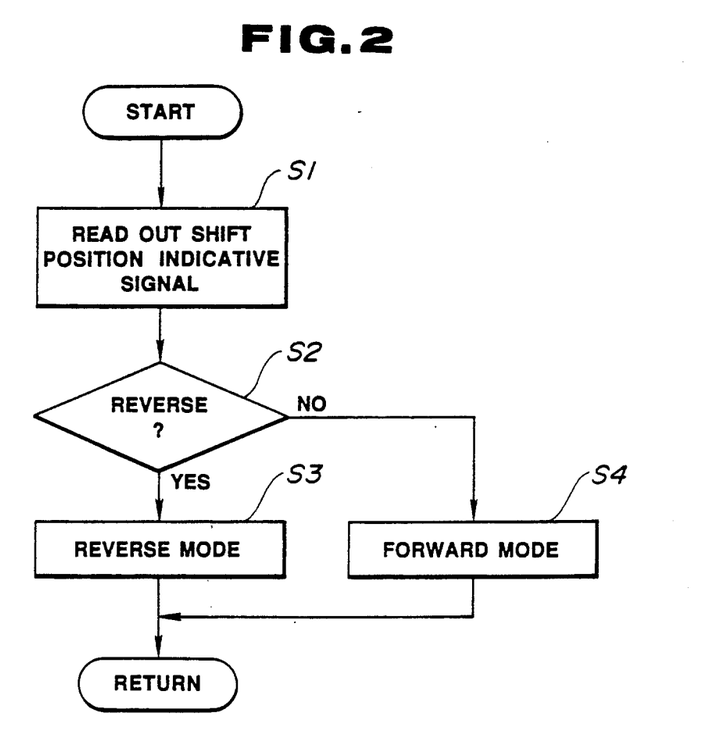
FIG. 2 is a flowchart of a routine for controlling output characteristics of the engine of FIG. 1.

FIG. 2 shows a flowchart of the spark ignition control routine to be executed by the control unit 7. In the shown routine, at first, the transmission shift position indicative signal is read out at a step $S_1$. Then, at a step $S_2$, the transmission shift position indicative signal as read out at the step $S_1$ is checked whether the read out signal represents the reverse gear position of the automatic power transmission.

If the transmission gear position as represented by the transmission shift position indicative signal is other than the reverse gear position, normal spark ignition control is performed at a step $S_4$. Namely, at any of the forward gear positions, the spark ignition control at the step $S_4$ is performed. During spark ignition control for the transmission forward gear position, an engine load data Tp (=Q (intake air flow rate)/N (engine speed)) and the engine speed N is used as primary control parameters. For deriving the spark advance angle, a map adapted for spark ignition control in the forward gear position of the automatic power transmission is used. The map used in the step $S_4$ will be hereafter referred to as the "forward gear position map".

Figure 3:
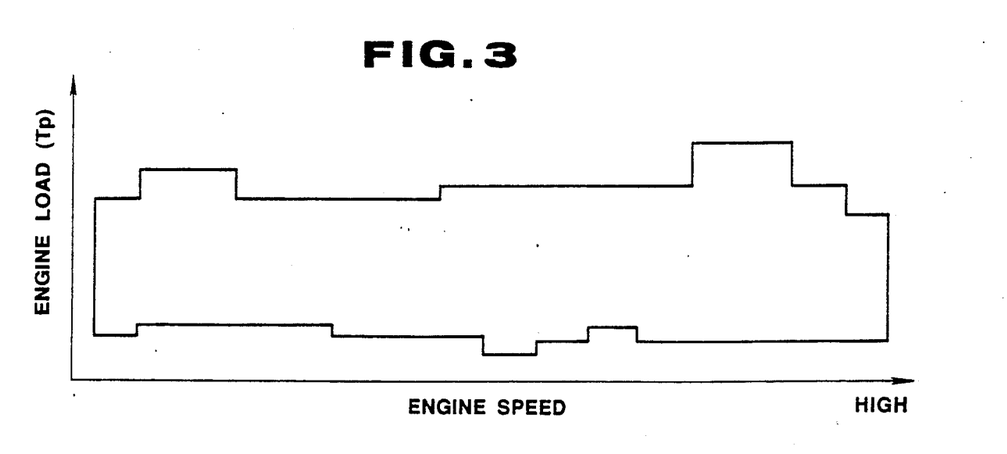
FIG. 3 is a timing chart showing operation of the preferred embodiment of the engine output characteristics control system of FIG. 1.

On the other hand, when the transmission gear position as checked at the step $S_2$ is reverse gear position, spark ignition control adapted for reverse driving is performed at a step $S_3$. During spark ignition control for the transmission reverse gear position, an engine load data Tp (=Q (intake air flow rate)/N (engine speed)) and the engine speed N is used as primary control parameters in similar manner to that for the forward driving. For deriving the spark advance angle, a map adapted for spark ignition control in reverse gear position of the automatic power transmission is used. The map used in the step $S_4$ will be hereafter referred to as the "reverse gear position map". The reverse gear position map is differentiated from the forward gear position map in a range as defined by the solid line in FIG. 3. Namely, when the point identified by the engine load Tp and the engine speed N is within the defined range, the spark advance angle in the reverse gear position map is retarded in a predetermined magnitude compared to that in the forward gear position map.

By the process set forth above, the engine output characteristics in the reverse gear position of the automatic power transmission can be lowered so that the lowered engine output make adjustment of vehicular reverse driving speed easier since accelerator control does not require delicate adjustment for obtaining the desired vehicle speed. It should be appreciated, though the shown embodiment is directed to engine output limitation for reverse driving, it may be possible to employ the same strategy for lowering the engine output and thus make the vehicle easier to drive at a substantially low speed, e.g., in a traffic jam.

Figure 4:
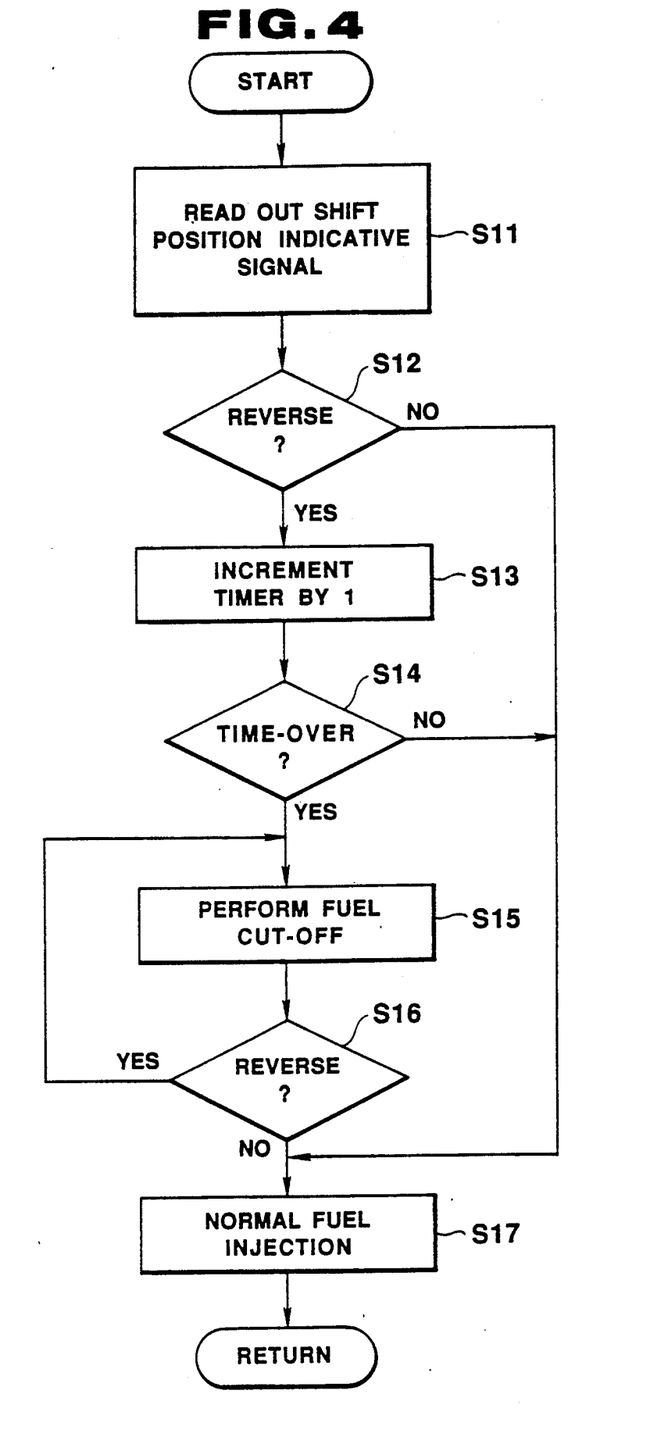
FIG. 4 is a flowchart showing another routine for performing engine output characteristics control.

Though the foregoing process shows engine output control by adjusting the spark advance angle, it may be possible to adjust the engine output in various other ways. For example, by adjusting fuel injection amount in response to the transmission shifted at the specific gear position, similar engine output control can be performed. FIG. 4 shows the process of transmission gear position dependent fuel injection control which is suitable for implementing the present invention.

In the process of FIG. 4, the transmission gear position indicative signal is read out at a step $S_{11}$. Then, a check is performed at a step $S_{12}$ whether the transmission is shifted into the reverse gear position as the specific gear position, or not. When the transmission is shifted at reverse position and thus the answer at the step $S_{12}$ is positive, a timer is triggered to start measurement of an elapsed time. Then, the timer value is incremented by one (1) at a step $S_{13}$. The timer value is thereafter compared with a predetermined timer criterion which represents a predetermined elapsed time for detecting reverse driving, at a step $S_{14}$. In the shown embodiment, the timer criterion is set at a value corresponding to about 0.8 sec., for example. If the timer value is smaller than the timer criterion as checked at the step $S_{14}$, process returns to the step $S_{12}$. Therefore, steps $S_{12}$ through $S_{14}$ is repeated until the transmission gear is shifted to the gear position other than the reverse gear position or the timer value becomes greater than the timer criterion. When the transmission gear is shifted from the reverse gear position to any of other gear position before the timer value reaches the timer criterion, the timer value is cleared at the step $S_{12}$.

The foregoing steps $S_{12}$, $S_{13}$ and $S_{14}$ are provided in order to prevent selection of control mode between a forward drive mode for controlling fuel injection at any of forward driving gear position and a reverse drive mode for controlling fuel injection at the reverse driving gear position, from causing hunting by temporarily shifting of the selector into the reverse gear position. Namely, in cause of the automatic power transmission of the typical select pattern, the selector lever is operated across the reverse gear position (R range) when shifting between automatic drive mode (D range) and parking mode (P range). Therefore, reverse gear position is temporarily detected for temporarily switching fuel injection control mode from the forward drive mode to the reverse drive mode if the aforementioned loop of the steps $S_{12}$ through $S_{14}$ is provided. The similar loop may be applicable for the process of FIG. 2.

When the timer value as checked at the step $S_{14}$ is smaller than the timer criterion, then process goes to a step $S_{17}$ for forward drive mode fuel injection control. On the other hand, when the timer value becomes greater than or equal to the timer criterion as checked at the step $S_{14}$, then fuel cut-off operation is performed at a step $S_{15}$ for lowering the engine output. At the step $S_{15}$ fuel cut-off operation may be performed for selected engine cylinders for performing partial cut-off. For example, in the case of V-type 8-cylinder engine, fuel cut-off is performed only for the engine cylinders in one of the bank. Furthermore, it may be possible to vary the number of engine cylinders for which the partial fuel cut-off is performed depending upon the engine speed. After performing partial cut-off operation at the step $S_{15}$, the transmission gear position is again checked at a step $S_{16}$. When the transmission gear position is maintained at the reverse gear position, then the process at the step $S_{15}$ is repeated. Therefore, steps $S_{15}$ and $S_{16}$ form a loop to be repeated until the transmission gear position is shifted into a gear position other than the reverse gear position.

When a transmission gear position other than the reverse gear position is detected at the step $S_{16}$, the process goes to the step $S_{17}$ for performing fuel injection for all of the engine cylinders.

Figure 5:
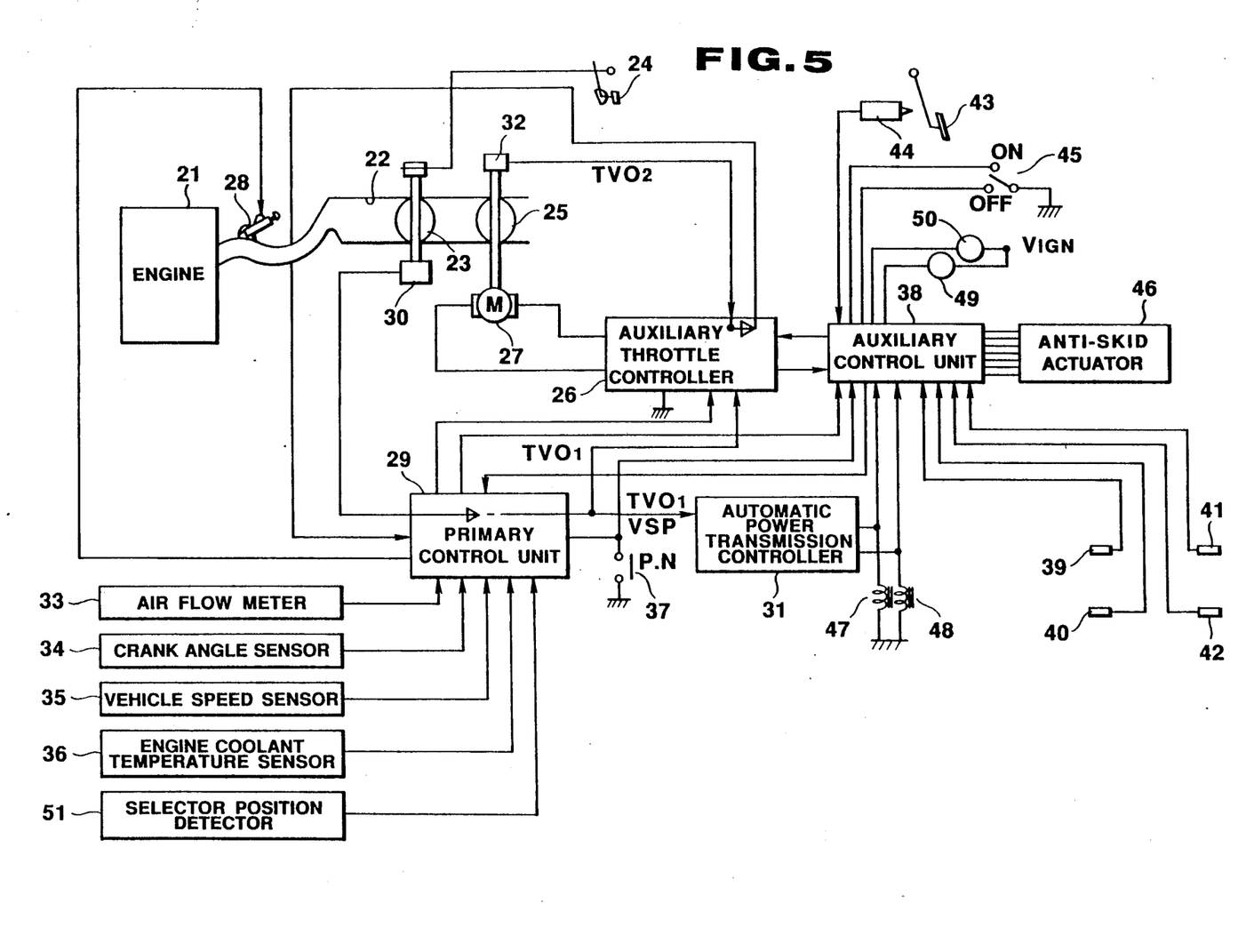
FIG. 5 is a block diagram of the second embodiment of the automotive engine with the engine output characteristics control system.

FIG. 5 shows another embodiment of the engine output control system according to the present invention. The shown embodiment of the engine output control system is applied for the type of the internal combustion engine which incorporates with an air induction system 22 disposed therein a primary and an auxiliary throttle valves 23 and 25 in tandem fashion. The primary throttle valve 23 is connected to an accelerator pedal 24 via a mechanical linkage system in per se well known manner. On the other hand, the auxiliary throttle valve 25 is associated with an electrically operable throttle servo system which includes a step motor 27 serving as a servo motor for adjusting the auxiliary throttle valve angular position, and a auxiliary throttle controller 26 connected to the step motor.

It should be noted that the auxiliary throttle valve 25 is controlled by the auxiliary throttle valve controller 26 so that it is normally placed at fully open position.

One or more fuel injection valves 28 are arranged in an intake manifold of the air induction system in the vicinity of the intake port of the engine cylinder of the engine 21. The fuel injection valve 28 is controlled by a fuel injection control signal fed from a primary control unit 29.

In order to perform control operation, the control unit 29 is connected to a primary throttle angle sensor 30 which monitors angular position of the primary throttle valve 23 to produce a primary throttle angle indicative signal $TVO_1$. The primary throttle angle indicative signal $TVO_1$ is also fed to the auxiliary throttle valve controller 26 as a data representative of the primary throttle valve angular position. The primary throttle angle indicative signal $TVO_1$ is further fed to an automatic power transmission controller 31. An auxiliary throttle angle sensor 32 is provided for monitoring the angular position of the auxiliary throttle valve 25 to output an auxiliary throttle angle indicative signal $TVO_2$ to the auxiliary throttle valve controller 26. The auxiliary throttle angle indicative signal $TVO_2$ is stored in the buffer of the auxiliary throttle valve controller 26 and transferred to the control unit 29.

The primary control unit 29 is further connected to an air flow meter 33 to received therefrom the air flow rate indicative signal, a crank angle sensor 34 to received therefrom a crank reference signal and the crank position signal, a vehicle speed sensor 35 to receive therefrom a vehicle speed indicative signal and the engine coolant temperature sensor 36 for receiving therefrom the engine coolant temperature indicative signal. The control unit 29 is further connected to a transmission neutral switch 37 which produces a neutral switch signal in response to setting of the transmission at neutral gear position (N range) or parking position (P range). The neutral switch signal of the transmission neutral switch 37 is further fed to an auxiliary control unit 38. To the auxiliary control unit 38 is connected to wheel speed sensors 39, 40, 41 and 42 which are respectively associated with front-left, front-right, rear-left and rear-right wheels for monitoring rotation speed of the associated wheel to produce the wheel speed indicative signals. The auxiliary control unit 38 is designed for performing wheel slippage dependent control based on wheel slippage derived on the basis of the front-left, front-right, rear-left and rear-right wheel speed indicative signals of the wheel speed sensors 39, 40, 41 and 42. Furthermore, the auxiliary control unit 38 is connected to a brake switch 44 which is associated with a brake pedal 43 for detecting depression of the brake pedal to produce a braking state indicative signal. In combination with the wheel speed indicative signals input from the wheel speed sensors 39, 40, 41 and 42 and the braking state indicative signal from the brake switch 44, the auxiliary control unit 38 may perform anti-skid or anti-lock brake control by providing brake control signal to an actuator or a pressure control valve unit 46 provided in an vehicular brake hydraulic circuit for optimum vehicular braking efficiency.

The manner in wheel slippage dependent control (traction control) and anti-skid brake control are performed by the auxiliary control unit 38 may be appreciated from the United States patents listed herebelow.

Traction Control

U.S. Pat. No. 4,763,912, issued on Aug. 16, 1988
U.S. Pat. No. 4,771,850, issued on Sept. 20, 1988
U.S. Pat. No. 4,872,731, issued on Oct. 10, 1989

Anti-Skid Control

U.S. Pat. No. 4,674,049, issued on June 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,876,650, issued on Oct. 24, 1989
U.S. Pat. No. 4,852,951, issued on Aug. 1, 1989
U.S. Pat. No. 4,809,182, issued on Feb. 28, 1989
U.S. Pat. No. 4,805,103, issued on Feb. 14, 1989

All of the aforementioned United States patents have been assigned to the common assignee to the present invention. The disclosures of the above-identified United States patents are herein incorporated by reference for the sake of disclosure of relevant structure and for assisting in developing a clear understanding of the present invention.

The auxiliary control unit 38 is associated with the auxiliary throttle valve controller 26 for providing an auxiliary throttle valve control signal. The auxiliary throttle valve controller 26 may serve as a driver circuit for providing a driver signal for the step motor 27 for driving the latter in a magnitude corresponding to the auxiliary throttle valve open angle as commanded by the auxiliary throttle valve control signal of the auxiliary control unit 38.

While the traction control is active, the auxiliary control unit 38 producing a traction control system active state indicative signal to be supplied to the primary control unit 29. Simultaneously, the auxiliary control unit 38 triggers a traction control active state indicator 49 for illuminating the indicator lamp. The auxiliary control unit 38 is so programmed to perform self-monitoring operation for detecting failure of the traction control system. When failure of the traction control is detected, the auxiliary control unit 38 output a traction control failure indicative signal for triggering a fail indicator 50.

On the other hand, the primary control unit 29 supplies preselected transmission control parameters including a vehicle speed data and a primary throttle valve open angle data $TVO_1$ to the automatic power transmission controller 31. The automatic power transmission controller 31 processes input control parameters for deriving the transmission gear speed ratio adapted to the current vehicle driving condition. In the typical automatic power transmission control, shift control signals are produced by the automatic power transmission controller 31 and fed to solenoids 47 and 48 for controlling position of various shift valves. It should be noted that through FIG. 5 explanatorily shows only two solenoids, it is of course possible to control more than two solenoids for controlling the valve positions of various shift valves for switching hydraulic communication for causing gear shifting operation.

In addition, the primary control unit 29 is connected to a selector position detector 51 which may be associated with a transmission selector lever for detecting demanded transmission operational range, such as P (park) range, R (reverse) range, N (neutral) range, D (automatic shift or drive) range, 2 (second speed radio hold) range, 1 (first speed ratio hold) range and so forth. The selector position detector 51 produces a selector position indicative signal to to supply for the primary control unit 29. The primary control unit 29 supplies the selector position indicative signal to the automatic power transmission controller 31 as one of control parameters. Furthermore, the primary control unit 29 performs transmission gear position dependent engine output operation in order to adapt the engine output characteristics to the vehicle driving condition.

The engine output control operation will take place in the preferred process according to the present invention, which preferred process will be discussed herebelow with reference to FIGS. 6 through 10.

Figure 6:
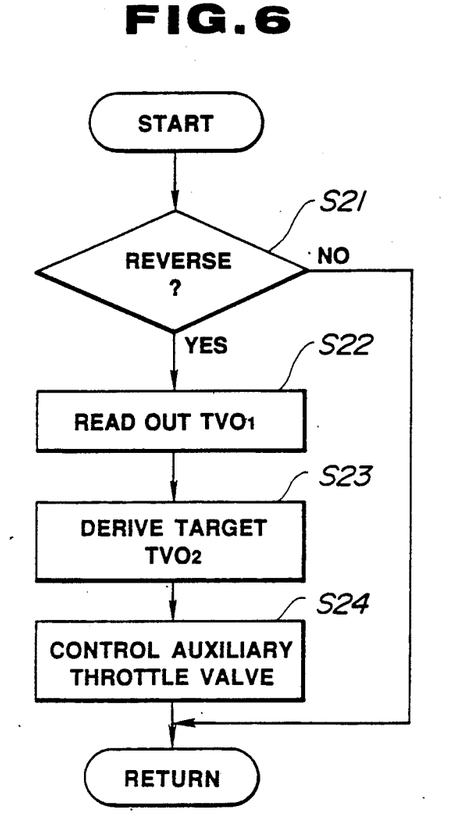
FIG. 6 is a flowchart of a routine to be executed by the engine output characteristics control system of FIG. 5.

FIG. 6 shows a flowchart of an engine output characteristics control routine to be executed by the primary control unit 29. In the shown process, the selector position indicative signal of the selector position detector 51 is initially read out and is checked whether it indicates R or reverse range at a step S21. If the selector position is other than R range, then the process of the engine output characteristics control routine goes END.

Figure 7:
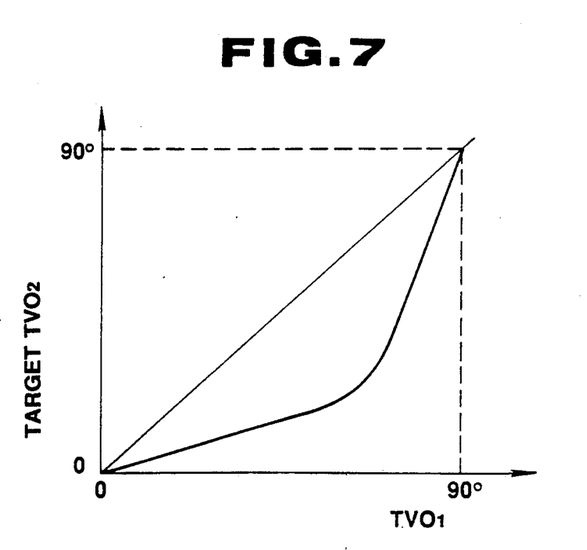
FIG. 7 is a graph showing the relationship between primary and auxiliary throttle valve open angles.
Figure 8:
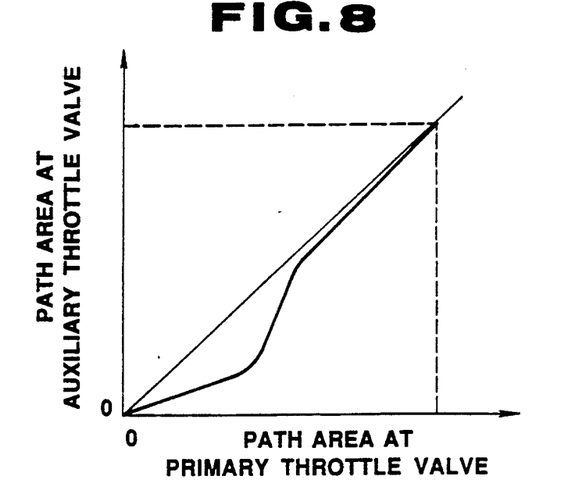
FIG. 8 is a similar graph to FIG. 8 but showing different characteristics of throttle open angle variation.

On the other hand, when the selector is indeed shifted to R range position and thus the selector position indicative signal indicates selection of R range, then the primary throttle valve angle indicative signal $TVO_1$ is read out at a step S22. Then, in terms of the throttle valve open angle $TVO_1$, the auxiliary throttle valve angular position is derived at a step S23. In practice, the auxiliary throttle valve open angle $TVO_2$ is co-related with the primary throttle valve open angle $TVO_1$ in a manner as illustrated in FIG. 7. As can be seen from FIG. 7, the auxiliary throttle valve open angle $TVO_2$ is set at relatively small open angle when the primary throttle valve open angle $TVO_1$ is relatively small, which represents that the driver's demand for engine acceleration is rather small. On the other hand, when the primary throttle valve open angle $TVO_1$ is relatively large, the secondary throttle valve open angle $TVO_2$ becomes large. By adjusting the secondary throttle valve open angle according to the characteristics as illustrated in FIG. 7, characteristics of intake air flow path area variation as illustrated in FIG. 8 can be obtained.

At step S24, the auxiliary throttle valve control signal is output to the auxiliary throttle valve controller 26 so that the step motor 27 can be driven for causing angular displacement of the auxiliary throttle valve to the desired angular position.

Figure 9:
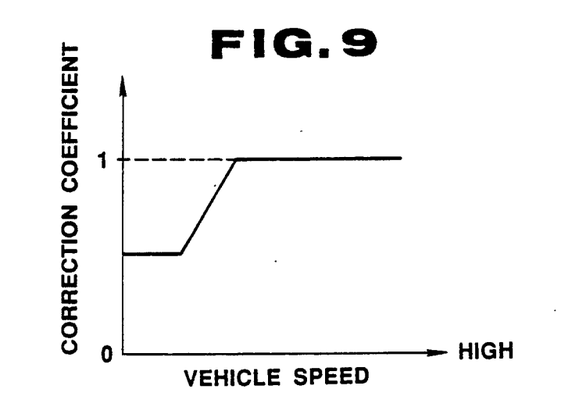
FIGS. 9 and 10 are graphs showing variation of correction value in relation to a vehicle speed and an engine revolution speed.
Figure 10:
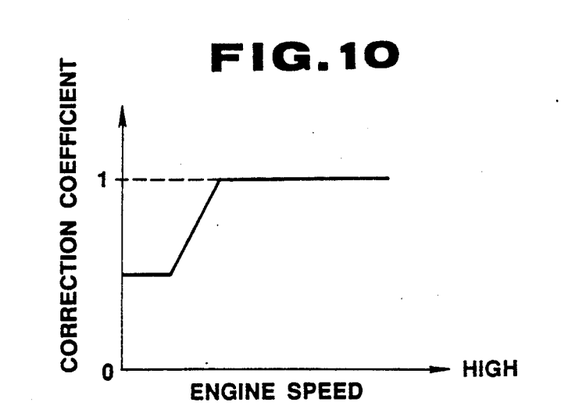

Though the aforementioned embodiment takes a strategy for varying the auxiliary valve open angle depending upon the open angle of the primary throttle valve, it may be possible to take other parameter, such as vehicle speed, engine speed and the like as parameter, representative of the driver's demand related to the engine output characteristics. Namely, as shown in FIGS. 9 and 10, by deriving correction coefficients depending upon the vehicle speed or engine speed so that the the correction coefficient is small at low vehicle speed range or low engine speed range, similar effect for adjustment of the engine output characteristics can be achieved.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. An output characteristics control system for an internal combustion engine of a vehicle having an automatic transmission for providing engine power to driving wheels of the vehicle, comprising:
   means, associated with the automatic power transmission, for detecting a predetermined specific gear position of the automatic transmission for producing a corresponding specific gear position indicative signal;
   means for selecting an engine output characteristic on the basis of the detected gear position of said automatic power transmission and generating a corresponding control signal, said engine output characteristic selecting means selecting a first normal output characteristic in the absence of said specific gear position indicative signal and selecting a second limited output characteristic in the presence of said specific gear position indicative signal for producing a control signal representing a selected one of said first and second output characteristics, the second limited output characteristic being lower in magnitude than the first normal output characteristic; and
   means, associated with said engine, for adjusting an engine output characteristic thereof according to said control signal.

2. An output characteristics control system as set forth in claim 1, wherein:
   said specific gear position is the reverse gear position.

3. An output characteristics control system as set forth in claim 1, wherein:
   said engine output characteristics adjusting means comprises
   a spark advance adjusting means for setting a spark advance of the engine at a normal advance angle to predetermined normal spark advance control parameters in said first normal output characteristic and for retarding the spark advance by a predetermined magnitude with respect to said normal spark advance parameters in said second limited output characteristic.

4. An output characteristics control system as set forth in claim 3, wherein:
   said engine output characteristics adjusting means progressively retards the spark advance according to an elapsed time during which the specific gear position ins maintained.

5. An output characteristics control system as set forth in claim 4, further comprising:
   means for monitoring an engine revolution speed for providing engine speed data, and
   means for monitoring an engine load for providing engine load data,
   wherein said engine output characteristics selecting means selects said second limited output characteristic when said specific gear position of said power transmission is selected while an engine operation range, as defined by said engine speed data and said engine load data, is within a predetermined range.

6. An output characteristics control system as set forth in claim 1, wherein:
   said engine output characteristics adjusting means comprises a fuel injection system which supplies fuel for all engine cylinders in said first normal output characteristic and supplies fuel for only a predetermined limited number of engine cylinders in said second limited output characteristic.

7. An output characteristics control system as set forth in claim 6, wherein:
   said engine output characteristics adjusting means decreases the number of engine cylinders to which fuel is supplied according to the duration of a period during which the specific transmission gear position is maintained.

8. An output characteristics control system as set forth in claim 1, wherein:
   said engine output characteristics adjusting means comprises an auxiliary throttle valve disposed within an air induction system of said engine and selects a fully open position of said auxiliary throttle valve in said first normal output characteristic and limits an opening angle of said auxiliary throttle valve to a predetermined, partially open, position in said second limited output characteristic.

9. An output characteristics control system as set forth in claim 8, wherein:
   said engine output characteristics selecting means derives the magnitude of a partially open angle of said auxiliary throttle valve in relation to a magnitude of an open angle of a primary throttle valve disposed in said air induction system and associated with an accelerator to be adjusted in angular position according to an operational position of an accelerator of the vehicle.

10. An output characteristics control system as set forth in claim 8, wherein:
    said engine output characteristics selecting means derives the magnitude of a partially open angle of said auxiliary throttle valve in relation to a vehicle speed.

11. An output characteristics control system as set forth in claim 8, wherein:
    said engine output characteristics selecting means derives the magnitude of a partially open angle of said auxiliary throttle valve in relation to an engine speed.

12. An output characteristic control system for an internal combustion engine of a vehicle, which includes an automatic transmission to transmit power from the engine to drive wheels of the vehicle, comprising:
    first means, associated with said engine, for selectively adjusting an engine output characteristic in response to a switch signal;
    second means, associated with the automatic power transmission, for detecting a predetermined transmission gear position and for producing a corresponding predetermined transmission gear position indicative signal; and
    third means for receiving the gear position indicative signal and for providing the switch signal to the first means so as to switch the engine output characteristics determined by the first means from a normal engine output characteristic to a specific engine output characteristic, the specific engine output characteristic being lower in magnitude than the normal engine output characteristic.

13. An output characteristic control system for an internal combustion engine as set forth in claim 12, wherein:
    the predetermined transmission gear position is a reverse gear position of the automatic power transmission.

* * * * *